United States Patent

Martin et al.

[11] Patent Number: 5,553,121
[45] Date of Patent: Sep. 3, 1996

[54] VOICE RESPONSE SYSTEM

[75] Inventors: David G. Martin, Eastleigh; Lawrence L. Porter, Lyndhurst, both of United Kingdom

[73] Assignee: IBM Corporation, Armonk, N.Y.

[21] Appl. No.: 467,328

[22] Filed: Jun. 6, 1995

[30] Foreign Application Priority Data

Aug. 19, 1994 [GB] United Kingdom ............... 9416823

[51] Int. Cl.⁶ .................................................. H04M 3/00
[52] U.S. Cl. .................................................. 379/88; 379/67
[58] Field of Search .............................. 434/321; 379/67, 379/88, 71, 72, 92

[56] References Cited

U.S. PATENT DOCUMENTS

| | | | |
|---|---|---|---|
| 3,747,228 | 7/1973 | Yamamoto | 434/321 |
| 4,544,804 | 10/1985 | Herr et al. | 379/202 |
| 4,747,125 | 5/1988 | Buchberger et al. | 379/67 |
| 4,926,255 | 5/1990 | Von Kohorn | 434/321 |
| 4,972,461 | 11/1990 | Brown et al. | 379/67 |
| 5,199,062 | 3/1993 | Von Meister et al. | 379/67 |
| 5,452,341 | 9/1995 | Sattar | 379/88 |

*Primary Examiner*—Krista M. Zele
*Assistant Examiner*—Daniel S. Hunter
*Attorney, Agent, or Firm*—Jeanine S. Ray-Yarletts

[57] ABSTRACT

The present invention relates to system for varying the voice menus and segments presented to the user of a voice response system according to the competence of the user. The response time of a user to voice prompts is measured and an average response time is determined. It is assumed that the lower the average response time, the greater the competence of the user. The average response time is used as an index to a table of ranges of response times. Each range has respective voice segments associated therewith. The voice segments comprise oral instructions or queries for the user and vary according to the anticipated competence of the user. If the average response time changes such that the voice segments indexed are different to the current voice segments then a data base containing information relating to user competence is updated to reflect such a change. Accordingly, when the user next interacts with the voice response system a new set of voice segments more appropriate to the user's competence with be played.

9 Claims, 4 Drawing Sheets

| STATE TABLE NAME : ACCOUNT BALANCE ||||
|---|---|---|---|
| STATE LABEL | ACTION | POSSIBLE RESULTS | NEXT STATE |
| START | ANSWER CALL | SUCCEED NOT SUCCEED | WELCOME, EXIT |
| WELCOME / RETURN | OBTAIN COMMAND | SUCCEED, FAIL | PROCEED, EXIT RETURN |
| PROCEED | | | |
| ⋮ | ⋮ | ⋮ | ⋮ |
| EXIT | CLOSE EVERYTHING | | |

FIG. 3

| VOICE MENU   VOICE SEGMENT TABLE : voice_segs_1 |||
|---|---|---|
| STATE | NEXT STATE | PARAMETERS |
| RESET TIME | | |
| PLAY PROMPT | RECEIVE INPUT | SEG 1 TO n |
| RECEIVE INPUT | STOP TIMER | BUFFER 1 |
| STOP TIMER | CALCULATION | NONE |
| CALCULATION | UPDATE | RESPONSE TIME |
| UPDATE | DETERMINE COMMAND | VOICE RANGE TABLE, DATA BASE ACCESS |
| DETERMINE COMMAND | RETURN COMMAND | COMMAND TABLE |
| RETURN COMMAND | | DETERMINED COMMAND |
| COMMAND || KEY (INDEX) |
| EXIT || 0 |
| PROCEED || 1 |
| RETURN || 2 |

FIG. 4

| VOICE SEGMENT NAME : voice_segs_1 |||
|---|---|---|
| SEGMENT ID | VOICE SEGMENT | DURATION |
| 1 | WELCOME TO IBM VOICE RESPONSE SYSTEM | 3s |
| ⋮ | ⋮ | ⋮ |
| n | KEY PRESSED IS INVALID | 2s |

FIG. 5

| RANGE OF AVERAGE RESPONSE TIMES | VOICE SEGMENTS |
|---|---|
| 0 − 10 | voice_segs_1 |
| 11 − 20 | voice_segs_2 |
| 21 − 30 | voice_segs_3 |
| 31 − 40 | voice_segs_4 |
| 41 − 50 | voice_segs_5 |

FIG. 6

VOICE RESPONSE SYSTEM

FIELD OF THE INVENTION

The present invention relates to a voice response system having dynamic voice menus.

BACKGROUND OF THE INVENTION

Voice response systems enable users thereof to access information using a conventional telephone. The interaction between the users and the system comprises various voice prompts output by the system and responses thereto input, via the telephone keypad, by the user. Voice response systems are used by service providers, such as banks, to fully or partially automate telephone call answering or responding to queries. Typically a voice response system provides the capability to play voice prompts comprising recorded voice segments or speech synthesised from text and to receive responses thereto. The prompts are generally organised in the form of voice menus invoked by state tables. A state table can access and play a voice segment or synthesise speech from given text. The prompts are usually part of a voice application which is designed to, for example, allow a customer to query information associated with their various banks accounts.

An example of such a voice response system is the IBM CallPath DirectTalk/6000 product as described in "IBM CallPath DirectTalk/6000 General Information and Planning" and "IBM CallPath DirectTalk/6000 Voice Application Development" (IBM, DirectTalk, DirectTalk/6000 and CallPath are trade marks of International Business Machines Corporation).

The IBM DirectTalk/600 product provides voice mail capabilities. Voice mail provides features such as those found in a telephone answering machine together with the capability to manipulate any stored messages. For example, if a subscriber wishes to listen to the messages stored, the voice mail will use a voice response system to indicate how many messages have been received, at what time and, possibly, from whom. The list of messages are manipulated using various voice menus or prompts presented to the subscriber by the voice response system. The voice response system typically asks the subscriber whether or not the messages are to be stored or forwarded to another subscriber.

Facsimile mail systems also use voice response systems in a similar manner to voice mail systems. Subscribers of facsimile system can manipulate stored facsimiles or have selected documents faxed to a specified facsimile number. Again, the voice response system present the subscriber with various options or menus which are used to manipulated the facsimiles. Actions are selected from the voice menus using the DTMF tones generated by conventional DTMF telephones. U.S. Pat. No. 4,918,722 and U.S. Pat. No. 4,974,254 disclose methods and system for retrieving facsimile data using voice response systems.

As the users of such system may not be familiar with the use thereof, it is necessary to ensure that the instructions or voice prompts are sufficiently comprehensive to allow an novice user to successfully interact with the system.

However, the more competent users are in using a particular voice response system the more they begin to anticipate the various voice prompts and it becomes increasingly tedious for them to have to listen to such comprehensive instructions when more succinct instructions would suffice.

SUMMARY OF THE INVENTION

Accordingly, the present invention provides a voice response system comprising
- means for conducting a telephone call with a user,
- means for storing a plurality of sets of voice prompts, each voice prompt comprising at least one voice segment which is capable of being played to said user,
- means for selecting one from said plurality of sets of voice prompts for use during the telephone call,
- means for outputting a voice prompt from said selected set of voice prompts to said user and for receiving a response thereto from the user, said response indicating to the system the user's requirements.

Therefore, when a particular user instigates, for example, a telephone call the system selects a set from the plurality of sets of voice prompts appropriate to the competence of the user. The sets of voice prompts are varied according to the anticipated or actual user competence. The use of more succinct voice prompts increases the speed with which a competent user can interact with the system.

An embodiment provides a system further comprising means for determining the competence with which said caller interacts with said system, and wherein said means for selecting selects a voice prompt according to the determined competence of the caller.

Therefore, the competence with which a user interacts with the system can be measured and the voice prompts selected for use during the current interaction or future interactions can be varied according to said measurements.

A further embodiment provides a system wherein the means for determining the competence comprises
- means for determining the response time between playing a voice prompt to the user and receiving said response thereto, and
- wherein said means for selecting is responsive to said means for determining a response time to select a voice menu according to the response time.

Therefore, one way in which the competence of the user can be gauged is, for example, by measuring the response time of a user to a voice prompt and assuming that a short response time is indicative of great familiarity with the voice response system. It is reasonable to assume that the faster the response the greater the competence of the user.

A still further embodiment provides a system wherein said means for receiving a telephone call comprises a plurality of telephone interfaces each capable of receiving a telephone call from said caller, and said system further comprises
- means for identifying upon which telephone interface a telephone call made by said caller was received, and wherein
- said means for selecting selects a set of voice prompts according to which telephone interface received the telephone call from said caller.

If several users have the same telephone, each user can be given a telephone number with which they can access the system and the voice prompt output to the user depends upon which number they used to access the system. Each such given number has associated therewith respective voice data, said voice data reflecting the anticipated competence of the users.

Alternatively, the selection of the set of voice prompts can be matched to individual callers. The users can be identified in many different ways. For example, if different user's have unique respective telephone numbers, the call identification code of a telephone call can be used as an index to data stored in a user data base comprising information relating to the competence of a user.

Alternatively, the user can be asked to enter a password before further access is allowed to the system. The password can then serve as an index to the stored data associated with the user. The stored data identifies which set of voice data is appropriate for use during an interaction with said user.

Alternatively, determining the number of times per day which a user accesses the system or the length of time which a user has subscribed to such a system may also be indicative of their competence.

A further embodiment provides means for determining how many times a user has accessed said system, and means for accessing and amending said stored data according to said determination.

BRIEF DESCRIPTION OF THE DRAWINGS

An embodiment of the present invention will now be described, by way of example only, with reference to the accompanying drawings in which:

FIG. 3 shows schematically the voice application of FIG. 2, FIG. 4 illustrates schematically the voice menu of FIG. 2 comprising voice states for playing and receiving responses to voice prompts and determining the speed of the response thereto, FIG. 5 shows the voice segment table comprising a plurality of voice segments, FIG. 6 illustrates a table comprising a plurality of average response times together with respective voice segments.

DESCRIPTION OF THE PREFERRED EMBODIMENT

Figure 1:
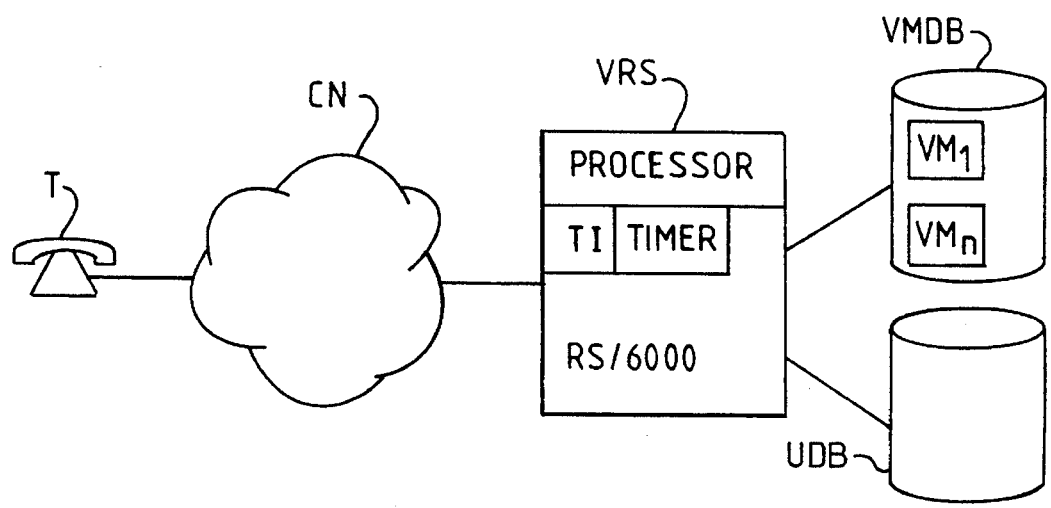
FIG. 1 shows schematically a voice response system.

Referring to FIG. 1 there is schematically shown a voice response system VRS, implemented using DirectTalk/6000, comprising an telephony interface TI, such as T1D4-Mode 3 interface for T1 or a CCITT G.703 interface for E1, for receiving from or transmitting to a telephone T via a communication network CN voice and signalling data. The voice response system VRS further comprises a voice menu data base VMDB in which voice menus $Voice\_menu_1$ to $Voice\_menu_n$ are stored in the form of voice tables together with a plurality of sets of voice prompts, a processor for executing voice applications, controlling access to the voice menu data base and, in conjunction with a timer, determining, via a voice menu, the average speed of response of a user to the voice prompts. The timer is provided via AIX system services. Each set of voice prompts comprises voice data which are played to the user during an interaction with the system. Each set of voice prompts is also designed for different levels of user competence. The system also comprises a user data base UDB which contains information from which a decision relating to the level of competence of the users can be made. The information allows appropriate voice prompts to be selected, and used in a voice menu, for user interaction with the system. The user data base also contains an identification of the current voice segments which are or will be used for any such interaction. A voice prompt for a reasonably competent user may be as follows:

For local maps and street plans, press 1,
For country maps and atlases, press 2,
For other countries, press 3,
For other types of maps, press 4.

It can be seen from the above example that the voice prompt comprises all four options in a single voice segment. An alternative way of viewing the above voice prompts is to consider it as a voice menu comprising a number of options to which only one response is required. The above example can also be constructed from a plurality of separate voice segments which are played contiguously to the caller.

By contrast a set of voice prompts which may be suitable for a less competent user may be as follows:

For local maps and street plans, press 1, for next item press 3

(await response)

For country maps and atlases, press 1, to go back press 2, for next item press 3, (await response)

For other countries 1, to go back press 2, for next item press 3, (await response)

For other types of map, press 1, to go back press 2, for next item press 3.

(obtain response)

It can be seen in the above example that the voice prompt comprises a plurality of voice segments and the user has an opportunity to respond to each segment before proceeding to the next segment. An alternative way of viewing the above voice prompt is to consider it to be a voice menu comprising a plurality of voice segments each of which requires a response from the caller.

Figure 2:
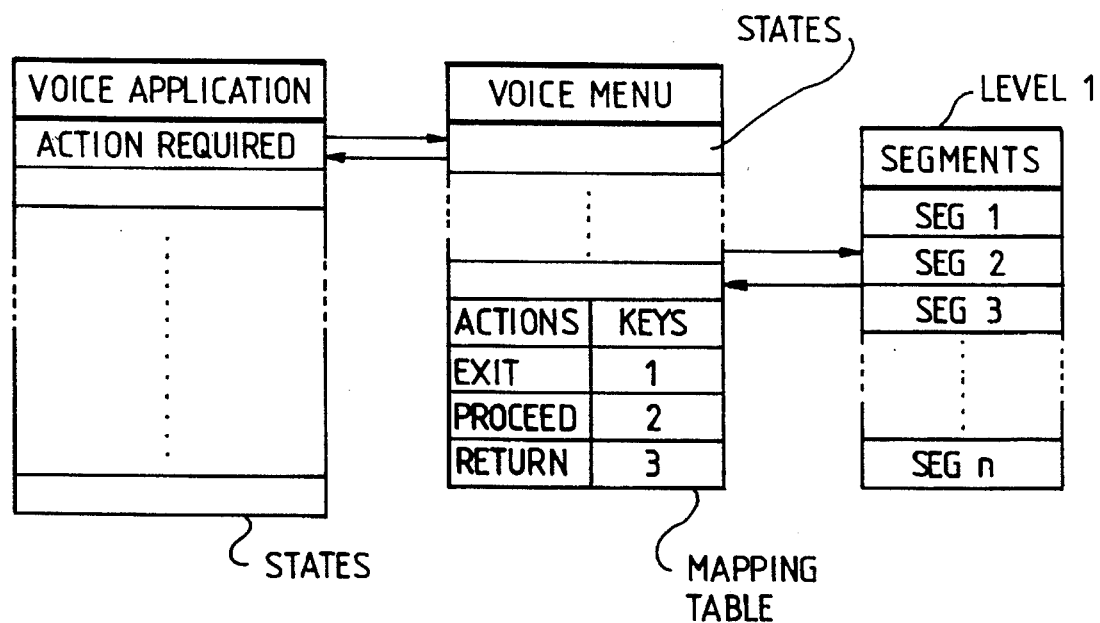
FIG. 2 illustrates schematically data structures used in a voice response system: namely a voice application, voice menu and voice segment tables.

Referring to FIG. 2, there are schematically shown data structures used in the voice response system to facilitate interaction with the user. The voice application controls the overall commands of the voice response system. The voice menu presents to a user at least one voice prompt comprising a set of voice segments and determines the speed of response thereto. The voice menu also updates the stored data concerning the level of the user's competence when appropriate.

FIG. 3 shows schematically the voice application. Voice applications handle information requests and perform the data processing within a voice response system VRS. A voice application typically comprises at least one state table having a sequence of states or instructions which accomplish the aim of the voice application. Each state of the voice application performs a given function such as update account or obtain a command from a caller so that a decision as to how to continue can be made. Whenever a command is required by the voice application it calls a voice menu. The voice menu outputs to the user appropriate voice prompts or segments and receives responses thereto.

FIG. 4 illustrates schematically the voice menu. The voice menu comprises at least the following states which are executed in the order presented: "Reset Timer" which resets the timer of the voice response system, "Play Prompt" which plays at least one identified voice segment or set of voice segments, "Receive Input" which receives the response to a prompt or voice segment on an interrupt driven basis, "Stop Timer" which stops the timer and records the time indicated, "Calculate" calculates the user's average response time to the voice segments (described in further detail below), "Update" updates, when necessary, the information relating to the user's competence which is stored in the user data base, "Determine Command" determines which one of a plurality of commands should be returned to the voice application, and "Return Command" which returns said one of a plurality of commands to the voice application. The voice menu also has a look-up table which contains the plurality of commands and corresponding keys. When the user selects a particular key in response to a prompt, that key is used to index the corresponding command in the table and the command so indexed is returned to the voice application.

The execution of the voice application is determined according to the commands returned by the voice menus. The commands are determined by the responses to the voice prompts presented to the user. Each application having instigated the playing of a voice prompt expects to execute one of a plurality of possible future actions. For example, if the following voice menu was played to the user:

To exit the system, press 1;

To continue with the query, press 2;

To return to the previous menu, press 3.

The voice application will expect to receive from the voice menu one of three possible commands. The commands are represented symbolically as, for example, EXIT, CONTINUE and RETURN. It can be seen that the voice application only receives information relating to any future command to be taken and is not concerned with how a returned command was obtained. For example, if the voice prompt was changed to:

To exit the system, press 7;

To continue with the query, press 8;

To return to the previous menu, press 9.

The application will still receive one of the three symbolic commands EXIT, CONTINUE or RETURN even though different keys were depressed to indicate to the voice menu the desired command or course of action.

The advantage of having the main voice application guided by symbolic commands becomes evident when one modifies either voice application or the voice prompts. Modifications can be effected to either the voice application or voice menu independently of the other. Therefore, as illustrated above, a change to the keys which must be depressed in order to guide the voice application does not necessitate a corresponding modification to the voice application to accommodate such a change. The voice menu is configured to expect different key depression but maps the different keys to the symbolic commands accordingly. In this way the operation and maintenance of the main voice application is isolated from the user interface or voice menus.

The sets of voice segments comprise a collection of voice segments which can be used to form a voice menu and to interact with the user. A schematic example of a voice segment table is shown in FIG. 5. For example, segment 1, plays the welcome message heard by users when they initially access the system.

Referring again to FIG. 1, the timer T is used to record the elapsed time between the beginning of a voice segment and the response thereto. Immediately prior to the voice menu playing, for example, voice segments embodying a list of options for which a response is required, the state, "Reset Timer", which resets and invokes the timer is executed. The user responds to the voice segments by pushing one of the keys of their telephone pad. The system detects the response, on an interrupt driven basis, by listening for an appropriate DTMF frequency in the conventional manner. When a response to the voice segments is detected the timer is stopped and the elapsed time between the beginning of the voice segments and the response thereto is determined.

The voice response system operates as follows. Upon initialisation the voice response system awaits an incoming telephone call. The voice response system uses the calling identification to retrieve information from the user data base which is suitable for use in the voice menus. That is, a set of voice prompts are identified which is suitable for the forth coming interaction. Accordingly, the name of the suitable set of voice segments is loaded into the voice menu under the heading of "Voice Segment Table" as shown in FIG. 4.

When the system answers the incoming call it plays a prompt welcoming the user as is conventional and then presents the user with a number of options, As the voice application at this stage requires an command in order to continue processing, a voice menu requesting an input from the user is invoked. The voice menu resets the timer T to zero and then commences playing the voice segments 1 to n identified by the "Voice Segment Table" field of the voice menu. The user will be expected to respond to the voice segments by pressing one of the keys on their telephone key pad. When the user presses a key, the voice segments currently being played are interrupted and the key so pressed is noted by the "Receive Input" state. Alternatively, if all of the voice segments have finished the system awaits a response for a predetermined time. After the predetermined time has elapsed the system assumes that the user has hung up and returns to a state awaiting the next incoming call. Assuming the user has responded, the timer is stopped via state "Stop Timer" and the time is recorded. The call identification of the incoming call is used, by the state "Calculation", to locate and retrieve information relating to the particular user. The information is stored in the user data base UDB. The information comprises the following: calling number identification number, average response time and number of determined response times. The "Calculation" state updates the average response time information as follows:

new average response time = (average response time ×
number of recorded times +
current response time)/(number of determined response times + 1).

The information relating to the number of determined response times is also incremented by one and stored. The "Update" state updates the stored data in the user data base in a manner described below. The "Determine Command" state maps the users response to one of the plurality of possible commands expected by the voice application. The "Return Command" state returns the determined command to the voice application.

Having received a command the voice application continues processing in the conventional manner until another command is required via another corresponding input from the user.

A suitable state table implementing the above is schematically shown in FIG. 4.

Once a new average response time has been determined a check is made by the "Update" state to ascertain whether or not the current set of voice segments is appropriate to the level of competence of the user. Referring to FIG. 6, there is shown a table comprising ranges of response times and respective sets of voice segments. The range into which the new average response time falls is determined and the corresponding set of voice segments identified. If the identified voice segments are different to current voice segments then the voice menu is updated to contain a reference to the identified set of voice segments. For example, if the current voice segments are voice_segs_1 and the new average response time fell within the range 10–20, the "Voice Segment Table" field of FIG. 4 would be changed from "Voice_segs_1" to "Voice_segs_2". The data stored in the user data base would also be updated to reflect the change in voice segment. Accordingly, when the user next accesses the system or when the voice menu is next invoked by the voice application the voice segments, voice_segs_2, contained within the newly identified set of voice segments will be used.

The sets of voice segments of FIG. 6 are tailored to reflect different levels of user competence. It is assumed that the lower response times are a reflection of greater user competence. The average response times shown in FIG. 6 are in arbitrary units. Voice_segs_1 may comprise tile following voice segments which are all played contiguously For local maps and street plans, press 1, For country maps and atlases, press 2, For other countries, press 3, For other types of maps, press 4.

It can be seen that when using the above the user must remember all of tile options or be very familiar therewith as there is no opportunity to listen to each individual voice segment again.

A suitable set of voice segments for a less competent user might be voice_segs_5 in which the voice segments are played separately as follow:

For local maps and street plans, press 1, for next item press 3

(await response)

For country maps and atlases, press 1, to go back press 2, for next item press 3, (await response)

For other countries 1, to go back press 2, for next item press 3, (await response)

For other types of map, press 1, to go back press 2, for next item press 3.

(obtain response)

It can be seen that voice_segs_5 allows the user more time to consider each voice segment or prompt separately and obviates the burden of remembering all of the possible options presented. Voice_segs 2 to 4 would represent sets of graduated voice segments which fall between voice_segs_1 and voice_segs_5.

Figure 7:
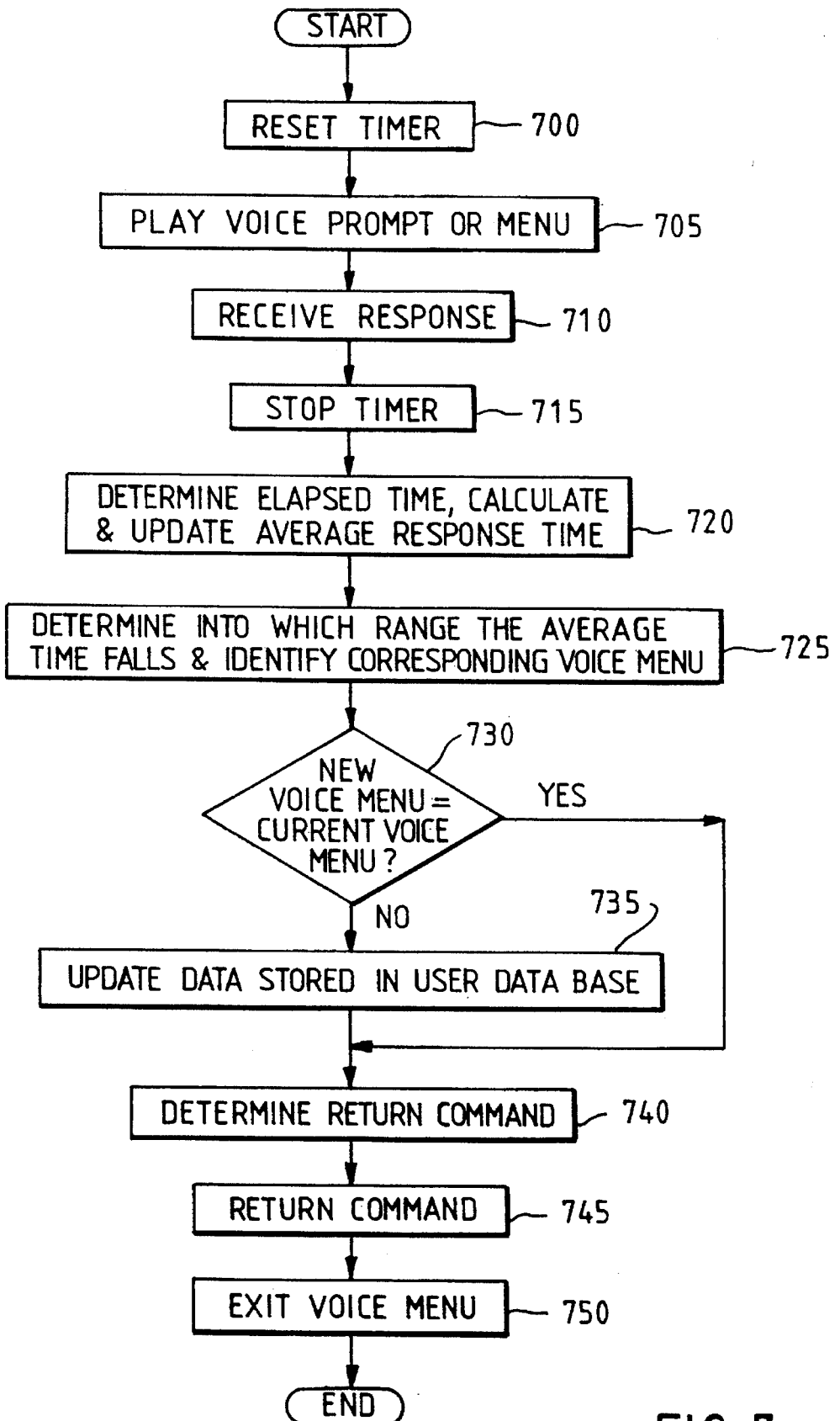
FIG. 7 shows a flow diagram illustrating the operation of the voice menu in the voice response system.

FIG. 7 shows a flow diagram schematically illustrating the operation of the voice menu in the voice response system. As a consequence of the voice application requiring an command in order to be able to proceed the voice menu is invoked. Step 700 resets the timer T. Step 705 commences playing the voice segments currently identified in by "Voice Segment Table" in the voice menu. The system awaits an input or is interrupted with such an input from the user via their telephone at step 710. At step 715 the timer is stopped and the time recorded. At step 720 the voice menu uses the calling identification to identify and retrieve stored data indicative of the level of competence of the user from the user data base. In an embodiment the retrieval of said information can be insitgated before an incoming telephone call is answered thereby playing a welcome message which is tailored to the callers competence. The data comprises an identification of voice segments appropriate to the level of competence of the user. The response time to the voice segments played to the user is determined step 720. Step 720 also calculates and updates the average response time to the voice segments. Next a determination is made as to whether or not the data stored in the user data base identifying the set of voice segments appropriate to a user should be updated to reflect the familiarity of that user with the voice response system. The determination is made by comparing the average response time with a series a ranges of response times at step 725. The range into which the average response time falls is determined together with the associated or new voice segments. If the new voice segments are different to the current voice segments, the data stored in the user data base is amended to store a reference to the new voice segments thereby reflecting a change in competence of the user at steps 730 and 735. If the new set of voice segments is the same as the current set of voice segments there is no need to amend the data stored in the user data base. Having amended the stored data or determined that there is no need to amend the data, the command to be returned to the voice application by the voice menu is determined at step 740 as follows. The response to the voice segments is used as index to the commands table. The command corresponding to the index or response is then returned to the voice application at step 745. Execution of the voice menu is terminated at step 750 and execution of the voice application reccommences in accordance with the returned command.

Although the above embodiment gauges user competence by measuring the response time to voice prompt, the present invention is not limited thereto. User competence can equally well be determined by, for example, keeping track of the total number of time which a user has accessed the system and varying the voice data according to said number.

Further, a voice response system can be realised comprising many or all of the above techniques. For example, having gained initial access to the voice response system via one of a plurality of possible telephone interfaces and accordingly retrieved voice prompt information associated with the telephone interface, the competence of the user can be monitored and the various voice prompts presented can be varied accordingly.

Similarly, tile embodiment requiring a pass word to be enter before allowing full system access can also include the means for measuring the speed of response of the user and varying the stored data and voice prompts accordingly.

The present invention can be used to vary either the voice menus used by the voice application or the voice segments accessed by the voice menus.

Although embodiments have been described in which the voice menus are dynamically varied during a call the present invention is not limited thereto. An embodiment can equally well be realised in which an average response time for a complete interaction with the user is determined and the stored data is accessed and amended only after the conclusion of the interaction. Such an embodiment would reduce the amount of time the system needed to update data associated with the user.

Further, even though the above embodiments describe systems in terms of an incoming call, the present invention can equally well be used to tailor the voice prompts for outgoing calls. The system, prior to instigating a call to a particular user, would identify from the user data base, using, for example, the user's telephone number, stored data indicative of the level of competence of the user. The identified stored data would then be used to determine suitable sets of voice prompts to be used for the interaction with the caller user.

We claim:

1. A voice response system comprising:
   means for conducting a telephone call with a user,
   means for storing a plurality of sets of voice prompts, each voice prompt comprising at least one voice segment which is capable of being played to said user, means for selecting one from said plurality of sets of voice prompts for use during the telephone call, means for outputting a voice prompt from said selected set of voice prompts to said user and for receiving a response thereto from the user, said response indicating to the system the user's requirements, means for determining the competence with which said user interacts with said system, and wherein said means for selecting selects a voice prompt according to the determined competence of the user, means for determining the response time between playing a voice prompt and receiving said response thereto, and wherein said means for selecting is responsive to said means for determining a response time to select a set of voice prompts according to the response time.

2. A system as claimed in claim 1, further comprising means, responsive to said means for determining the competence with which said user interacts with said system, for accessing and amending stored data reflecting said competence.

3. A system as claimed in claim 1, wherein said means for receiving a telephone call comprises a plurality of telephone interfaces each capable of receiving a telephone call from said user, and said system further comprises means for identifying upon which telephone interface a telephone call made by said user was received, and wherein said means for selecting selects a set of voice prompts according to which telephone interface received the telephone call from said user.

4. A system as claimed in claim 1 or 2, further comprising means for identifying the user, and means, responsive to said identification, for accessing stored data associated with the user, the stored data being indicative of the competence of the user, and wherein said means for selecting is responsive to said stored data.

5. A system as claimed in claim 4, further comprising means for recording how many times a user has interacted with the system, and means for accessing and amending said stored data according to said determination.

6. A system as claimed in claim 1 or 2, further comprising voice menus and means for modifying said sets of voice segments independently of said voice menus, said means for modifying comprising memory for storing a table comprising a plurality of indices, each index corresponding to a possible user response, and respective data corresponding to respective commands, wherein said voice menus are responsive to said commands, means for indexing using a user response one of said plurality of commands, and means for guiding the operation of said system according to said one of said plurality of commands.

7. A system as claimed in claim 3, further comprising voice menus and means for modifying said sets of voice segments independently of said voice menus, said means for modifying comprising:

memory for storing a table comprising a plurality of indices, each index corresponding to a possible user response, and respective data corresponding to respective commands, wherein said voice menus are responsive to said commands, means for indexing using a user response to one of said plurality of commands, and means for guiding the operation of said system according to said one of said plurality of commands.

8. A system as claimed in claim 4, further comprising voice menus and means for modifying said sets of voice segments independently of said voice menus, said means for modifying comprising:

memory for storing a table comprising a plurality of indices, each index corresponding to a possible user response, and respective data corresponding to respective commands, wherein said voice menus are responsive to said commands, means for indexing using a user response to one of said plurality of commands, and means for guiding the operation of said system according to said one of said plurality of commands.

9. A system as claimed in claim 5, further comprising voice menus and means for modifying said sets of voice segments independently of said voice menus, said means for modifying comprising:

memory for storing a table comprising a plurality of indices, each index corresponding to a possible user response, and respective data corresponding to respective commands, wherein said voice menus are responsive to said commands, means for indexing using a user response to one of said plurality of commands, and means for guiding the operation of said system according to said one of said plurality of commands.

* * * * *